United States Patent [19]

Voorhies et al.

[11] Patent Number: 5,704,024
[45] Date of Patent: Dec. 30, 1997

[54] METHOD AND AN APPARATUS FOR GENERATING REFLECTION VECTORS WHICH CAN BE UNNORMALIZED AND FOR USING THESE REFLECTION VECTORS TO INDEX LOCATIONS ON AN ENVIRONMENT MAP

[75] Inventors: Douglas Voorhies, Menlo Park; James Foran, Milpitas, both of Calif.

[73] Assignee: Silicon Graphics, Inc., Mountain View, Calif.

[21] Appl. No.: 504,773

[22] Filed: Jul. 20, 1995

[51] Int. Cl.$^6$ .................................................. G06T 15/50
[52] U.S. Cl. .................................................. 395/126
[58] Field of Search ........................... 395/119, 120, 395/126, 129, 130

[56] References Cited

U.S. PATENT DOCUMENTS

| | | | |
|---|---|---|---|
| 4,901,064 | 2/1990 | Deering | 395/126 |
| 5,063,375 | 11/1991 | Lien et al. | 395/126 |
| 5,253,339 | 10/1993 | Wells et al. | 395/126 |
| 5,563,989 | 10/1996 | Billyard | 395/126 |

OTHER PUBLICATIONS

Blinn & Newell, "Texture and Reflection in Computer Generated Images", Communications of the ACM, vol. 19, No. 10, pp. 456–461, 1976.

Haeberli & Segal, "Texture Mapping as a Fundamental Drawing Primitive", Proc. Fourth Eurographics Workshop on Rendering, pp. 259–266, Jun. 1993.

Voorhies & Foran, "Reflection Vector Shading Hardware", Computer Graphics Proceedings, Annual Conference Series SIGGRAPH 94, pp. 163–166, Jul. 24, 1994.

Segal, et al., "Fast Shadows and Lighting Effects Using Texture Mapping", Computer Graphics, vol. 26, pp. 249–252, Jul. 1992.

*Primary Examiner*—Mark Z. Zimmerman
*Assistant Examiner*—Cliff N. Vo
*Attorney, Agent, or Firm*—Blakely, Sokoloff, Taylor & Zafman

[57] ABSTRACT

An apparatus for generating a reflection from a three-dimensional environment map. The apparatus includes a reflection vector generator which receives an eye vector and a normal vector neither of which need be normalized. This reflection vector generator generates a reflection vector without vector normalization. The reflection vector generator then couples to a decoder to supply the generated reflection vector. The decoder, in turn, determines a location where the reflection vector indexes the selected 2-dimensional map which forms part of the environment map.

19 Claims, 12 Drawing Sheets

METHOD AND AN APPARATUS FOR GENERATING REFLECTION VECTORS WHICH CAN BE UNNORMALIZED AND FOR USING THESE REFLECTION VECTORS TO INDEX LOCATIONS ON AN ENVIRONMENT MAP

BACKGROUND OF THE INVENTION

1. Field of the Invention

The present invention relates to the field of computer graphics, and particularly to a method and an apparatus for generating reflection vectors which can be unnormalized and for using these reflection vectors to index locations on an environment map.

2. Description of the Related Art

Interactive computer graphics systems have been widely used in industrial design for the modeling, visualization, and manufacture of complex surfaces such as automobile bodies. A three-dimensional image is represented in a computer graphics system as a collection of three-dimensional geometric primitives (i.e., three dimensional objects), which are defined in a three-dimensional world coordinate system. Each three-dimensional geometric primitive is composed of a number of geometric entities, such as character strings, points, straight lines, curved lines, and filled areas (polygons, circles, etc.). For instance, geometric primitives are commonly represented by polygon meshes, which are sets of connected, polygonally bounded planar surfaces (such as triangles or quadrilaterals).

In addition, often for each graphical primitive, a computer system stores corresponding attributes, which describe how the particular primitive is to be displayed. Common attributes that are stored by computer systems are color specifications, line styles, and text styles. The attributes and the geometric entities of the geometric primitives are then used to render the primitives on a two-dimensional display device, which is composed of a number of pixels whose coordinates are defined relative to a two-dimensional display device coordinate system. This process for transforming a collection of three-dimensional graphical objects into two-dimensional displayed images is called rendering. Literally, the rendering process takes three-dimensional object information and converts it to two-dimensional pixel representation of the object.

One attribute that computer graphic systems have long sought to incorporate into their computer graphic models are surface reflections. Surface reflections are useful for appraising the smoothness and the curvature of complex surfaces as surface reflections are the classic way humans perceive surface shapes. More specifically, because for both real-life and computer generated objects a viewer best observes an object's surface characteristics (i.e., the surface smoothness and curvature) when the object's surface richly reflects light (i.e., the object is shiny) and the viewer moves interactively with respect to the object, computer graphic systems have long sought to produce rich surface reflections at real time speeds (i.e., at speeds that allow the viewer to move interactively with respect to the object).

However, rendering geometric primitives with rich surface reflections at real time speeds has been an elusive goal for reflection rendering hardware. To correctly model the optical physics would require the evaluation of a bi-directional reflectance function at each displayed point of the computer generated model (i.e., at each point of the geometric primitives that is represented by a pixel on the display device). Each bi-directional reflectance function then has to be convolved with the hemispherical illuminating scene visible from the particular surface point corresponding to the reflectance function. Unfortunately, these calculations of the bi-directional reflectance functions and the hemispherical convolutions are computationally unrealizable for real-time reflection rendering systems.

Consequently, prior art computer graphic systems employ gross approximations, such as point light source and mirror reflection approximations, in order to incorporate surface reflections in their models. However, even after using these approximations to model surface reflections, these prior art computer graphic modeling techniques have been unable to render rich surface reflections at real time speeds.

A. Point Light Source Models

Point light source approximation models use a variation of the following illumination equation to represent an object's surface reflection intensity I:

$$I = \sum_{1 \leq \lambda \leq n} I_\lambda \quad \text{(i)}$$

$$= \sum_{1 \leq \lambda \leq n} \left[ (I_{ambient\lambda} + \sum_{1 \leq j \leq m} (I_{diffuse j\lambda} + I_{specular j\lambda}) \right],$$

where (1) $\lambda$ represents a wavelength of light, such as red, green, or blue, (2) $I_{s0}$ is the intensity of the reflected light, (3) $I_{ambient\lambda}$ is the intensity of the ambient light component, (4) $I_{diffuse j\lambda}$ is the intensity of the diffuse reflection light component for each point light source j, and (5) $I_{specular j\lambda}$ is the intensity of the specular reflection component for each point light source j. The ambient light component is used to model reflections of non-directional sources of light which uniformly illuminate a computer generated object. The ambient light component is represented by the following equation:

$$I_{ambient\lambda} = I_{a\lambda} K_a O_{d\lambda},$$

where (1) $I_{a\lambda}$ is the intensity of the ambient light which is constant for all objects, (2) $K_a$ is an object's ambient-reflection coefficient which determines the amount of ambient light reflected from the object's surface, and (3) $O_{d\lambda}$ is the object's diffuse color.

In addition, in order to represent an object's surface reflections due to directional point light sources, computer graphic systems incorporate the diffuse and specular reflection characteristics of an object. FIG. 1 presents a vector diagram of the diffuse and specular reflection characteristics of directional point light sources. The diffuse reflection component ($I_{diffuse j\lambda}$) represents a directional point light source's reflections from a surface that are scattered with equal intensity in all directions independent of the viewing direction. In other words, the diffuse reflection component of the reflected light appears equally bright from all the viewing angles and has its brightness dependent only on the angle $\theta_j$ between light source j direction vector $L_j$ and surface normal vector N. The diffuse reflection component is represented by the following equation:

$$I_{diffuse j\lambda} = I_{pj\lambda} K_d O_{d\lambda} \cos \theta_j,$$

where (1) $\lambda$ represents a wavelength of light, such as red, green, or blue, (2) $I_{pj\lambda}$ is the intensity of point light source j, (3) $K_d$ is the object's material diffuse-reflection coefficient, (4) $O_{d\lambda}$ is the object's diffuse color, and (5) $\theta_j$ represents the angle between light source j direction vector $L_j$ and surface normal vector N (as shown in FIG. 1). When light source direction vector $L_j$ and surface normal vector N are normalized, $\cos \theta_j$ equals the dot product between these two vectors.

Prior art computer graphic systems further model the surface reflections due to directional point light sources by incorporating the specular reflection characteristics of an object. The specular reflection component ($I_{specular,j\lambda}$) incorporates into the point light source lighting model the highlights (i.e., bright spots) that light sources create on an object. Specular reflections are the result of reflection of incident light in a concentrated region. The specular reflection angle is the angle formed by the specular-reflection vector $SR_j$ and surface normal vector N, and is equal to the angle between light source direction vector $L_j$ and surface normal vector N.

One manner of representing the specular reflection component $I_{specular,j\lambda}$ is set forth by the following equation:

$$I_{specular,j\lambda} = I_{Pj\lambda} K_s O_{s\lambda} \cos^n \alpha_j$$

where (1) $\lambda$ represents a wavelength of light, such as red, green, or blue, (2) $I_{Pj\lambda}$ is the intensity of point light source j, (3) $K_s$ is the object's material specular-reflection coefficient, (4) $O_{s\lambda}$ is the object's specular color, (5) $\alpha_j$ is the angle between the reflection vector $SR_j$ and the viewing direction vector E (as shown in FIG. 1), and (6) n represents the material's specular reflection exponent whose magnitude is proportional to the shininess of the object. If the direction of reflection vector $SR_j$ and viewpoint direction vector E are normalized, then $\cos \alpha_j$ equals the dot product of these normalized vectors. Furthermore, reflection vector $SR_j$ can be derived from direction of light vector $L_j$ and surface normal vector N. More specifically, when surface normal vector N and direction of light vector $L_j$ are normalized, the mirroring of $L_j$ about N results in the reflection vector having a value $2*N*(N \cdot L_j) - L_j$. Consequently, if surface normal vector N, direction of light vector $L_j$, and viewpoint direction vector E are normalized, then $$\cos \alpha_j = (2*N*(N \cdot L_j) - L_j) \cdot E.$$

One example of a prior art point light source reflection modeling technique shades a polygon surface by linearly interpolating intensity values across the surface of the polygon. More specifically, under this approach, each polygon surface is shaded by performing the following operations: (1) ascertaining the unit normal vector at each polygon vertex, (2) applying a variation of the above-mentioned illumination equation (i) to each vertex to calculate the vertex intensity, and (3) performing Gouraud shading by linearly interpolating the vertex intensities over the surface of the polygon. The Gouraud shading technique is not relatively computationally intensive because it requires normalization operations to be performed only at each vertex. Consequently, this prior art shading model can be used to render specular reflections at real time speeds because it can be implemented by hardware (as it is not computationally intensive).

Unfortunately, there are several disadvantages for rendering specular reflections by using Gouraud shading. For instance, the Gouraud shading technique (i.e., linear intensity interpolation technique) is a poor choice for rendering surface highlights because it accentuates the polygonal nature of the model and introduces Mach banding effects.

More specifically, when a curved surface is approximated by a polygon mesh and each polygon facet in the mesh is shaded individually through interpolation, each polygon facet may be easily distinguishable from its neighbors whose orientations are different, because adjacent polygons of different orientation may have different intensity derivatives along their border. When computer graphic systems incorporate Gouraud shading, the lateral inhibition of the receptors in the eye exaggerates the intensity change at any edge where there is a discontinuity in the slope of the intensity (i.e., creates Mach banding effect). Thus, linear intensity interpolation is inappropriate where the surface lighting has high second derivatives (such as near the edge of specular highlights) because such surfaces must either be tessellated so finely that linear intensity interpolation loses its performance advantage or be left more coarsely tessellated and rendered with faceted highlights and obvious Mach bands.

Another prior art point light source reflection modeling technique is the Phong shading model. This shading technique is a more accurate method for rendering surface reflections on a computer generated object, because this shading model linearly interpolates each normal vector at each pixel and then uses these interpolated normal vectors to determine the intensity of the reflected light at each pixel. More specifically, the Phong shading model renders a polygon surface by carrying out the following steps: (1) ascertaining the unit normal vector at each polygon vertex, (2) linearly interpolating the vertex normals over the surface of the polygon, and (3) applying a variation of the above-mentioned illumination equation (i) to calculate projected pixel intensities for surface points. Intensity calculations using interpolated normal vectors produce more accurate results than the direct interpolation of intensity values (as in the Gouraud shading). Consequently, the Phong shading model displays more realistic specular highlights on a polygon surface while reducing the Mach banding effects.

The trade-off, however, is that Phong shading requires extensive calculations per pixel and per light source, which make this shading model too slow for rendering interesting surface reflections in real time. This prevents the use of Phong shading for interactive computer graphics. More specifically, Phong shading is much more computationally intensive than Gouraud shading because Phong shading requires that each interpolated normal vector (N) to be normalized. In turn, the normalization of the normal vector (N) reduces the speed of Phong shading because normalizing a vector involves an inverse square root function, which cannot be inexpensively implemented by hardware.

In addition, the inverse square root function necessary for normalizing a vector is expensive if high precision is required; if this function is approximated by using a table lookup technique any errors will be magnified mercilessly by subsequent specular exponent calculation. Furthermore, in order to perform Phong calculations in hardware, the cosine raised to a power function (which is used for calculating the specular reflection component) is a precision nightmare. Also, performing Phong calculation by hardware is problematic because the $\cos^n \alpha_j$ calculation must be repeated for every light source, which makes the performance of the Phong shading hardware dependent on the number of light sources. This dependence on the number of point light sources is especially problematic when approximating area lights.

B. Mirror Reflection Approximation Models

Two examples of surface reflection modeling techniques that use mirror reflection approximation models are ray tracing techniques and environment mapping. Ray tracing determines surface reflections by tracing imaginary rays of light from the viewer's eye to the objects in the scene. The basic ray tracing algorithm first sets up a center of projection (i.e., the view from the eye) and a window on an arbitrary view plane. The window is divided into a regular grid whose elements correspond to pixels at the desired resolution. Then, for each pixel in the window, an eye ray is fired from the center of projection through the pixel's center into the scene. Illumination effects accumulated along this ray's path are then assigned to the pixel. The basic ray tracing algorithm also provides for visible-surface detection, shadow effects, transparency, and multiple light source illumination. For example, to calculate shadows, an additional ray is transmitted from the point of intersection to each of the light sources. If one of these shadow rays intersects an object along the way, then the object is in shadow at that point and the shading algorithm ignores the contribution of the shadow ray's light source.

Ray traced displays can be highly realistic, particularly for shiny objects, but they require considerable computation time to generate. More specifically, even if the number of reflections is limited to five or ten reflections, ray tracers have fundamental problems that make them unrealizable for real time rendering hardware. For example, since ray tracing accounts for the local three-dimensional position of reflected objects, ray tracing algorithms are extremely costly and slow. Each reflected ray probes surrounding objects, which multiplies the already high intersection testing load and makes rendering time not linear with complexity.

Surface reflections can also be rendered by environment mapping, which is an alternative procedure for modeling global reflections by (1) defining an array of intensity values that describe the environment surrounding the rendered three-dimensional object, and then (2) projecting these intensity values in relationship to a viewing direction onto the graphical primitives that form the image. Information in an environment map includes intensity values from sources such as light sources, the sky, or other background objects.

An environment map contains a representation of the outside world as viewed from a single point, with the simplifying assumption that the outside world is infinitely far away. Thus an environment map M is indexed only by the reflection direction. This indexing does not communicate the distance between the object and the environment. Furthermore, typically environment mapping algorithms presume that other objects in the three-dimensional image do not obscure the projection of the environment onto a particular object.

To render surface reflections for an object, reflection vectors are first computed for all displayed points of the geometric primitives (i.e., for all geometric primitives' points that are represented by pixels on the display device). A reflection vector can be derived for a particular displayed point P (which is represented by a corresponding pixel on the display device) of a geometric primitive by mirroring the eye (i.e., viewpoint direction) vector E about the surface normal vector N at point P. If surface normal vector N and eye vector E are normalized, the mirroring of E about N yields the following equation for the reflection vector:

$$R_n = 2 * N_n * (N_n \cdot E_n) - E_n,\qquad\text{(ii)}$$

where the subscript "n" denotes that the vector is normalized.

This reflection vector is then used to index (i.e., to reference) a location on environment map M. Conventional texture mapping techniques then can be employed to impose on the pixel representing displayed point P the two-dimensional image that is obtained at the indexed location in the environment map. For example, the intensity of the reflected light at the pixel corresponding to point P can be determined by averaging the intensity values within the indexed region of the environment map. Anti-aliasing also can be incorporated into the environment mapping model by filtering some number of intensity values surrounding the indexed location in the environment map.

Environment mapping avoids the performance shortcomings of ray tracing because environment mapping makes several approximations. For example, because environment maps represent an outside world at infinity, they are an arbitrary function of direction alone and ignore parallax (i.e., ignore the position of an object relative to the center of the environment in determining the location to sample on the environment map). Ignoring parallax dramatically simplifies the calculation of the index into the map. Thus, the environment map may be pre-computed since it is the image of the environment as viewed from a single reference point.

One implementation of environment mapping in the prior art involves the computation of a normalized eye vector E and a normalized surface normal vector N for each pixel on the object to determine a reflection vector R which is used to index a location on one of 6 faces of a cubic environment map. A cubic environment map can be created by taking six pictures of the environment that surrounds an object with a wide angle camera that has a horizontal and vertical view of 90°. These environment maps are then often stored as 6 2-dimensional maps in texture map storage. This implementation is performed in software and very slowly produces, even on fast hardware, good, distortion-free results. This prior art environment mapping technique is slow because each E and N vector at each displayed pixel must be normalized in order to generate a reflection vector R at each pixel based on the prior art equation (ii), and the normalization process is computationally intensive and hence slow. The results are good because the calculations are performed for all displayed pixels without linear interpolations between vertices of a polygon. Thus, while the results are good, the slowness of this implementation precludes its use for real time, interactive uses of environment mapping.

A faster alternative implementation of environment mapping uses interpolation from the reflection vectors at the vertices of the geometric primitive rather than calculating normalized reflection vectors at each displayed pixel of the primitive. In this approach, described in Haeberli, P. and Segal, M., a Texture Mapping as a Fundamental Drawing Primitive, Proc. Fourth Eurographics Workshop on rendering, Paris, France, June 1993, pp. 259–266, a normalized reflection vector is generated, using the prior art approach of equation (ii) above, at each vertex of a polygon. That is, normalized E and a normalized N vectors are computed only for the vertices of the polygon and then normalized R vectors are computed for only the vertices. These R vectors at the vertices are then used to index the environment map. In this implementation, the environment map is also a cubic environment map, and each reflection vector from the particular vertex indexes a location on one of the six faces of the cubic environment map unless the polygon has reflections onto 2 (or more) different faces of the cubic environment map. If this reflection onto 2 or more faces occurs, then the polygon is subdivided into 2 or more polygons, each of which projects only onto a single face of the cubic environment map, and the reflection vectors for each vertex of each subdivided polygon are used to index into the selected face of the map. For displayed pixels of the polygon which are not at the vertices, the reflection vector for each such pixel is determined from interpolation (usually linear) of the reflection vectors at the vertices. The use, in this implementation of environment mapping, of interpolation speeds up the processing required to produce an image with reflections from an environment map because normalization, although required for some pixels, is only required for the vertices of displayed polygons. However, the use of interpolation introduces distortion into the reflections produced by this technique; this is because the indexes into the environment map are linearly interpolated between the vertices and linear interpolation does not accurately correspond to the angular change in the reflection vector across a polygon. These distortions can make the image appear less realistic. Another disadvantage of this technique is that subdivision of polygons is necessary when the reflections project onto 2 or more faces; this subdivision also requires computation time and complicates the environment mapping process. Thus while this technique requires less normalization and is faster than the first environment mapping technique described above and allows the viewer to be movable, this technique suffers from distortion in the reflections (producing distorted images) and requires polygon subdivision.

Yet another implementation of environment mapping uses a circular environment map and has been descried in Haeberli and Segal, supra at page 264. Also see, e.g. FIG. 1 at page 164 in Voorhies, D. and Foran, J., Reflection Vector Shading Hardware, Computer Graphics Proceedings, SIGGRAPH 94, pages 163–166 (1994). In this implementation, a single circular environment map is indexed by a normalized reflection vector at each vertex of the polygon, and the reflection vector indices for the remaining pixels of the polygon are interpolated between the indexes at the vertices of the polygon. Since there is only one map, a polygon's reflections cannot project onto different faces and consequently polygon subdivision is not necessary; this improvement makes the process faster and less complicated. While some normalization is required, it is not done for all pixels and thus this implementation is relatively fast; in fact, it is fast enough to be considered practical for some real time, interactive computer graphics.

Unfortunately this implementation with a circular map has several disadvantages. First, some normalization is still required. Furthermore, indexing a circular texture map is correct only for rendering with a fixed viewer. This latter limitation is a poor match to emulating the physical inspection of a car body, for example, where the viewer walks around a stationary car. Virtual reality devises such as the stereoscopic boom emphasize this natural "inspection" paradigm, where the object and environment stay fixed, while the viewer roams at will. Altering the eye position requires creation of a new map, which is challenging to do in real time. Thus, this implementation is not practical for most real time, interactive computer graphics.

Interpolation within a circular map also has two severe artifacts. Grazing reflections map to points near the perimeter, but they are extremely sensitive to object normals. A tiny object rotation can result in a vertex texture index snapping to the opposite side of the map. Secondly, linear texture index interpolation in this "reflection-in-a-sphere" circular map causes severe distortion of the reflection, especially for near-grazing reflections. Although there is sufficient resolution and minimal distortion at the center of the map, the periphery may be very distorted and the mapping extremely anisotropic.

It can be seen from this discussion that while some implementations of environment mapping yield good, distortion-free results but are slow, other implementations are faster, allowing real-time interactivity, but at the expense of distorted reflections and, in the case of circular environment maps, a fixed viewer, and, in the case of cubic environment maps with interpolation, polygon subdivision. It will be appreciated that it is desirable to provide computer graphics having fast, real-time, interactive reflection shading of objects without distortion, without polygon subdivision and with a moveable viewer.

SUMMARY OF THE INVENTION

The present invention provides a method and an apparatus for generating reflection vectors without vector normalization and for using these reflection vectors to index a three dimensional environment map.

In one embodiment, the present invention provides a method for generating a reflection vector that indexes a three-dimensional environment map. This method comprises the steps of (1) receiving an eye vector and a normal vector neither of which need be normalized, (2) producing a reflection vector without vector normalization, and (3) determining the location where the reflection vector indexes the three-dimensional environment map.

In accordance with another aspect of the present invention, an apparatus is provided for generating a reflection vector that indexes a three-dimensional environment map. The apparatus includes a reflection vector generator for receiving an eye vector and a normal vector neither of which need be normalized. This reflection vector generates a reflection vector without vector normalization. The reflection vector generator then couples to a decoder to supply the generated reflection vector. The decoder, in turn, determines a location where the reflection vector indexes the three-dimensional environment map and in turn, a light shading value is retrieved from the three-dimensional environment map, which is typically stored in random access memory.

Interpolation between map indexes at polygon vertices is unnecessary because the reflection vector can be computed at every pixel since the computationally intensive process of normalization is not necessary at all. Consequently the invention does not produce distorted reflections in computer graphics images and moreover there is no need for polygon subdivision since the choice of the 2-dimensional map selected by a reflection vector is made for each pixel of a polygon. Moreover, the invention allows for a moveable viewer, allowing realistic, fast, real-time interactive computer graphics with rich reflection shadings.

DETAILED DESCRIPTION OF THE INVENTION

The present invention provides a method and an apparatus for generating reflection vectors which can be unnormalized (i.e., can have non-unit lengths) and for using these reflection vectors to index locations on an environment map. In the following description for purposes of explanation numerous details are set forth in order to provide a thorough understanding of the present invention. However, it will be understood by one of ordinary skill in the art that these specific details are not required in order to practice the invention. In other instances, well-known electrical structures and circuits (such as adders, subtracters, multipliers, etc.) are shown in block diagram form in order not to obscure the description of the present invention with unnecessary detail.

Figure 1:
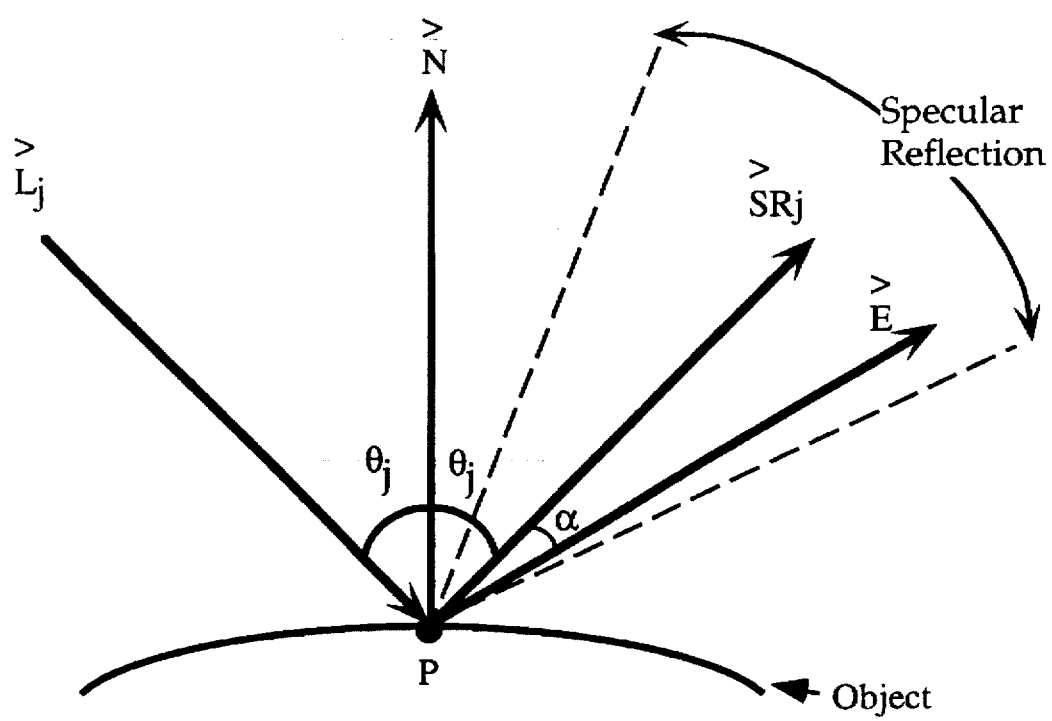
FIG. 1 sets forth a vector diagram of an object's diffuse and specular reflection characteristics due to directional point light sources.
Figure 2:
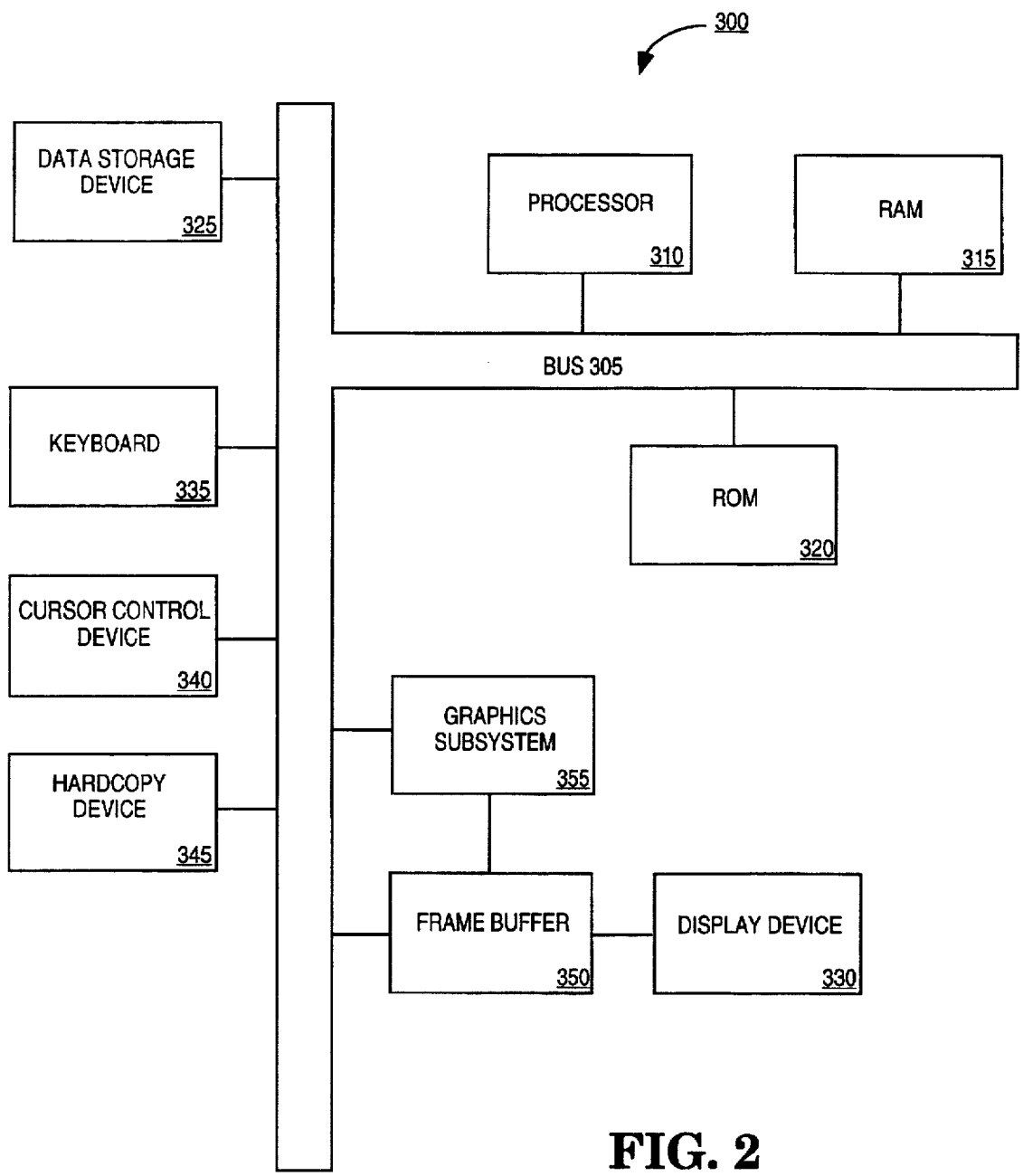
FIG. 2 presents a computer system upon which one embodiment of the present invention is implemented.

FIG. 2 presents a computer system upon which one embodiment of the present invention is implemented. Computer system 300 includes bus 305 for communicating information. A processor 310 couples with bus 305 for processing digital data. Computer system 300 also includes a random access memory (RAM) 315 coupled to bus 305 for storing digital data and program instructions for execution by processor 310. Computer system 300 further includes a read only memory (ROM) 320 coupled to bus 305 for storing static information and instructions for processor 310. In addition, mass data storage device 325, such as a magnetic disk or an optical disk and its corresponding disk drive, may also be included in the system.

Alphanumeric input device 335 (e.g., a keyboard) may also be coupled to bus 305 for communicating information and command selections to processor 310. An additional user input device which may be coupled to bus 305 is cursor controller 340. Input device 340 may take many different forms, such as a mouse, a trackball, a stylus tablet, a touch-sensitive input device (e.g., a touchpad), etc. Another device which may be coupled to bus 305 is hard copy device 345 which may be used for printing a hard copy on paper.

Computer system 300 further includes a display device 330, such as a cathode ray tube (CRT) or a liquid crystal display (LCD), for displaying information to a computer user. Display device 330 couples to bus 305 via frame buffer 350, which stores the pixel data for driving the display device 330. This stored pixel data is generated by graphics subsystem 355, which is coupled to both processor 310 and frame buffer 350. It should be noted that alternative embodiments of graphics subsystem 355 embody frame buffer 350.

One embodiment of graphics subsystem 355 includes a storage means (e.g. a Dynamic Random Access memory (DRAM)) for storing one or more environment maps. Graphics subsystem 355 could further include processing means for performing perspective correct texture mapping (for performing per pixel divisions) during the rendering process. The graphics subsystem 355 would further include processing elements for transforming between coordinate systems and for performing other processing needs of the present invention.

The rendering process of the present invention begins by the processor 310 providing graphics subsystem 355 with the visual description of three-dimensional objects in the scene being rendered. This visual description takes the form of drawing commands and world coordinate vertex data for the geometric entities that form the geometric primitives of the image. The world coordinate system is the coordinate system in which the three-dimensional objects are described. The world coordinate vertex data describes the object's geometric position, color, and surface normal vectors. The graphics subsystem 355 then performs transformations and other graphics operations to calculate specific pixel values for each of the pixels on display device 330.

In one embodiment of graphics subsystem 355, the object data from the processor is processed in a four stage pipeline before being displayed on the screen. These four pipeline stages include: 1) a Geometry Subsystem, 2) a Scan Conversion Subsystem, 3) a Raster Subsystem, and 4) a Display Subsystem. The Geometry Subsystem receives the graphical data from the processor to generate screen-space data, which define an object's positions in a screen coordinate system corresponding to the visible plane of the display monitor screen. The Scan Conversion Subsystem then breaks down points, lines, polygons, and meshes to thereby produce pixel data. One embodiment of the present invention is implemented in the Scan Conversion Subsystem. This pixel data is sent to the Raster Subsystem where a z-buffer removes hidden surfaces. The Raster Subsystem also performs various blending and texturing functions on a pixel-by-pixel basis as the pixels are written to the frame buffer. Finally, the Display Subsystem reads the frame buffer and displays the image on a color monitor. Finally, it should be noted that any other configuration for computer system 300 may be used in conjunction with the present invention.

Figure 3:
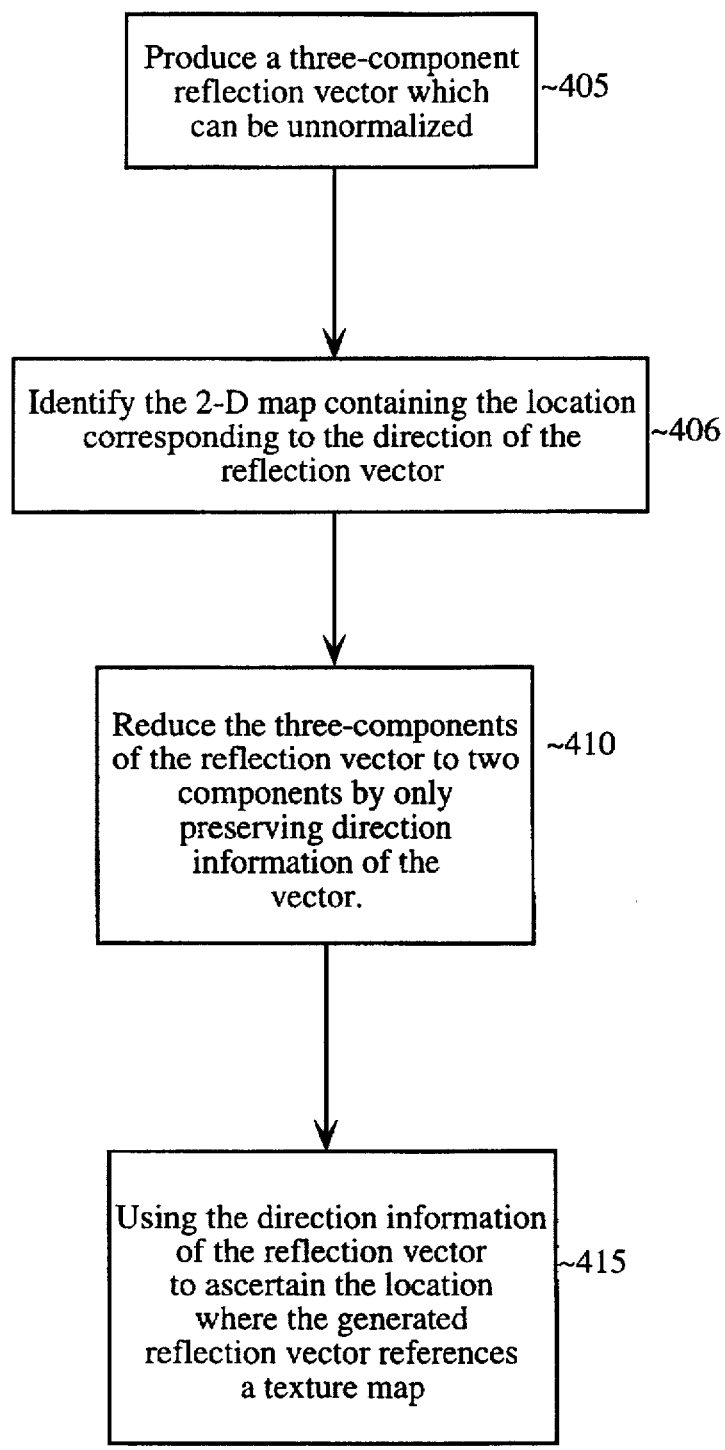
FIG. 3 presents one embodiment of the reflection vector shading method of the present invention.

FIG. 3 sets forth one general embodiment of the reflection vector generation method of the present invention. As shown in this figure, at step 405, the process produces for a point P on a geometric primitive a three-component reflection vector which can be unnormalized. At step 406, the corresponding 2-dimensional (2-D) map is identified. This corresponding 2-D map is a portion of the environment map and corresponds to the direction of the reflection vector. At step 410, the three components of the reflection vector are reduced to two components by only preserving the direction information of the reflection vector. Finally, at step 415, the direction information of the reflection vector is used to ascertain the location in the corresponding 2-D map. This direction information typically provides an address which is used to index the corresponding 2-D map at the indexed location. This indexed location on the 2-D environment map can then be supplied to conventional texture mapping algorithms or devices, which then determine the surface shading attributes for the pixel representing displayed point P on the display device. For example, the texture mapping device could determine the pixel shading attributes by averaging the intensity values within the indexed region of the environment map.

Figure 4:
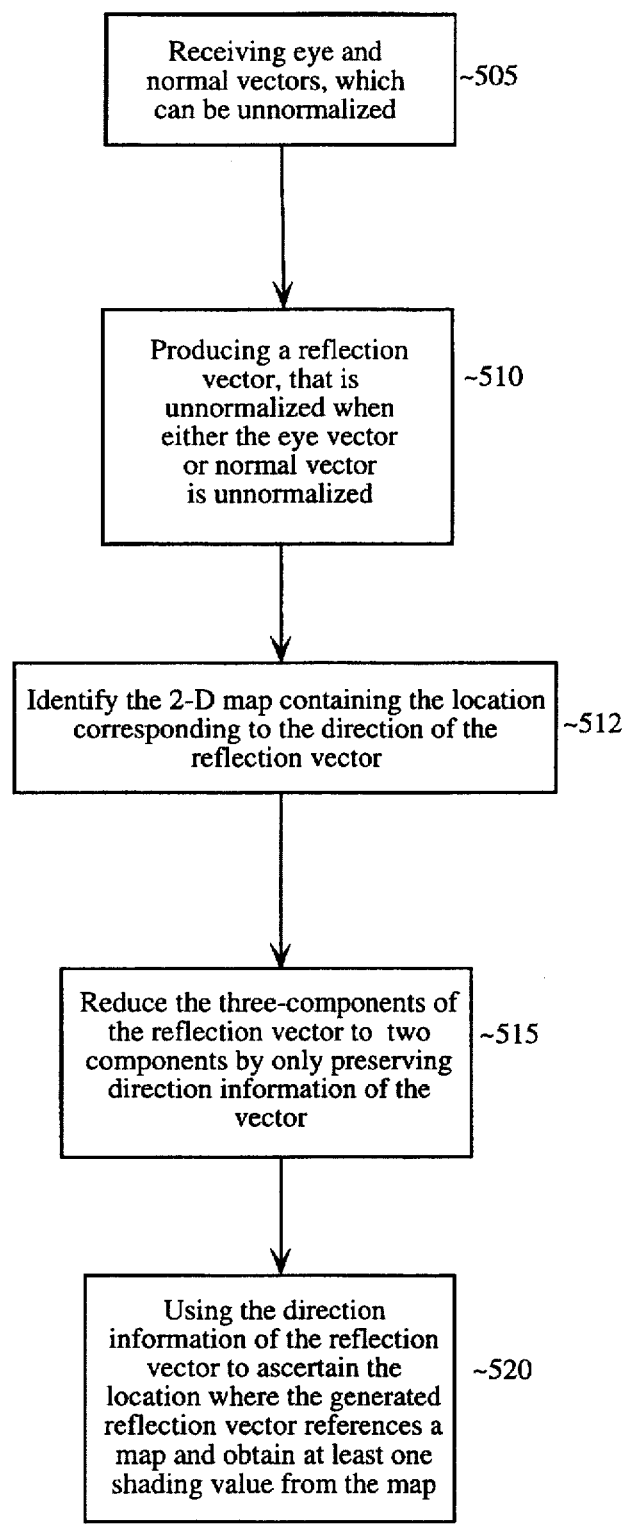
FIG. 4 presents another embodiment of the reflection vector shading method of the present invention.

FIG. 4 sets forth one embodiment of the reflection vector generation method of the present invention. As shown in this figure, at step 505, an eye vector E and a surface normal vector N, for a graphical object's particular displayed point P (i.e., a point on the object that is represented by a pixel on the display device), are received. Both of these vectors can be unnormalized and in the preferred they are both unnormalized in order to avoid the computations involved in obtaining normalized vectors. At step 510, a reflection vector is produced. This reflection vector is an unnormalized vector when either the normal vector or the eye vector is unnormalized. At step 512, the corresponding 2-dimensional (2-D) map is identified. This corresponding 2-D map is a portion of the environment map and corresponds to the direction of the reflection vector. At step 515, the components of the reflection vector are reduced to two components to provide the 2-dimensional index values which are used to locate, at the indexed location, the shading values in the corresponding 2-D map. In step 520, at least one shading value is obtained from the 2-D map at the indexed location. This shading value at the indexed location on the environment map can then be supplied to conventional texture mapping algorithms or devices, which then determine the surface shading attributes for the pixel representing displayed point P on the display device. For example, the texture mapping device could determine the pixel shading attributes by averaging the intensify values within the indexed region of the environment map.

Figure 5:
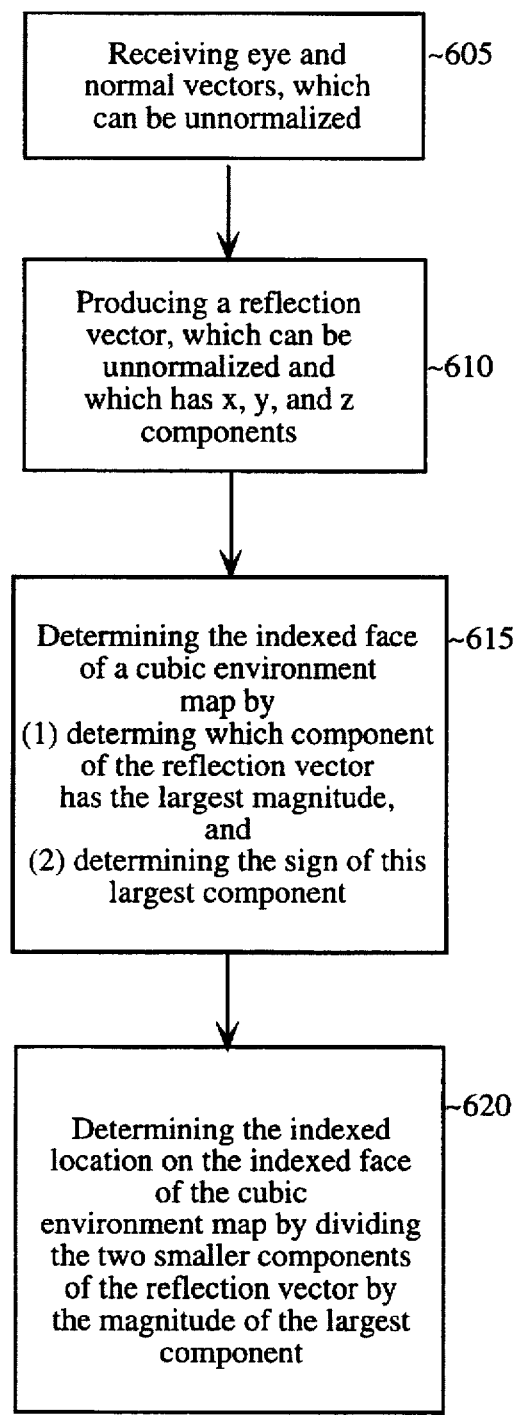
FIG. 5 presents yet another embodiment of the reflection vector shading method of the present invention.

FIG. 5 sets forth a more detailed embodiment of the present invention's method for generating reflection vectors and for using these reflection vectors to index locations on a cubic environment map which is aligned with the coordinate system which specifies the reflection vector. As shown in this figure, at step 605, an eye vector E and a surface normal vector N, for a graphical object's particular displayed point P (i.e., a point on the object that is represented by a pixel on the display device), are received. Both of these vectors can be unnormalized. At step 610, a reflection vector is produced. This reflection vector is an unnormalized vector when either the normal vector or the eye vector is unnormalized. Moreover, this reflection vector is represented by three Cartesian coordinates $R_x$, $R_y$, and $R_z$. In one embodiment of the present invention, the reflection vector is produced by using the following equation:

$$R=2*N*(N \cdot E)-E*(N \cdot N), \quad \text{(iii)}$$

which, as mentioned below, is derived from the prior art equation (ii).

As mentioned before, a cubic environment map can be created by taking six pictures of the environment that surrounds an object with a camera. This cubic environment map is aligned with the world coordinate axes, so that the largest coordinate of a normalized reflection vector indicates the appropriate side to index. Alternatively, a cubic environment map can be generated by the computer (1) by selecting a center of projection, (2) rendering the objects in the computer generated environment for the six cube faces, and (3) recording these images as the cubic environment map. The six faces of a cubic environment map (which are selectively referenced by three-dimensional reflection vectors) can be stored as six two-dimensional maps in conventional two-dimensional texture mapping hardware.

As further shown in FIG. 5, at step 615, the 2-D map containing the location corresponding to the direction of the reflection vector is determined. Because the cubic environment map is aligned with the axis of the coordinate system the largest coordinate of the reflection vector and the sign of this coordinate indicate the face of the map that the reflection vector indexes. Consequently, at step 615, the face of the environment map that the reflection vector indexes is derived by (1) determining the component of the reflection vector (i.e., $R_x$, $R_y$, and $R_z$) that has the largest magnitude, and (2) determining the sign of this largest component. At step 620, the location where the reflection vector indexes the referenced face of the map is deduced by dividing the two smaller components of the reflection vector by the magnitude of the largest component. This dividing step provides two values which specify the indexed location.

Figure 6:
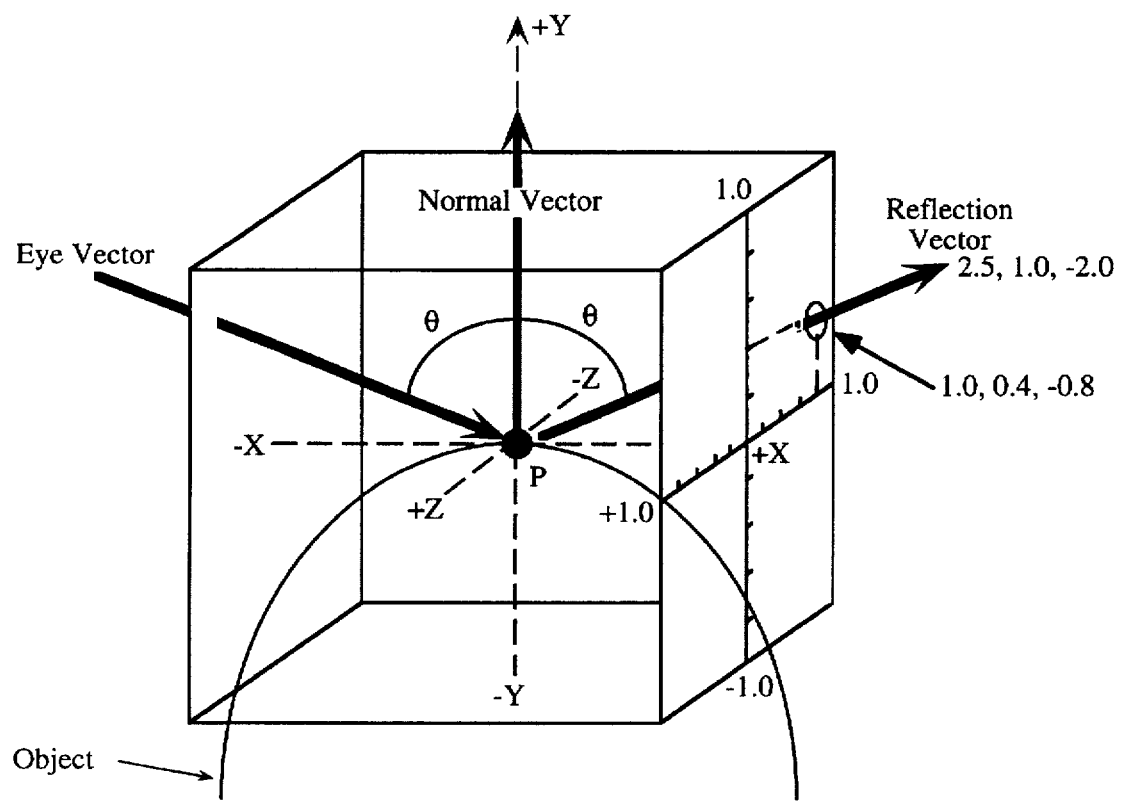
FIG. 6 presents a vector diagram of the generated reflection vector of the present invention indexing a cubic environment map which is aligned with the axis of the coordinate system.

An example of steps 615 and 620 is shown in FIG. 6 (which presents a vector diagram of a generated reflection vector of the present invention indexing a cubic environment map which is aligned with the axis of the coordinate system). The reflection vector is represented by the coordinates 2.5, 1.0, −2.0, in this coordinate system. At step 615 a determination is made that the reflection vector indexes the x equals one face of the cubic environment map by (1) determining that the x coordinate of the reflection vector has the largest magnitude, and (2) determining that the sign for the x coordinate is positive. Thus, the X=+1 face is the indexed face in this case. At step 620, the $R_y$ and $R_z$ components are divided by the magnitude of the $R_x$ component to determine the indexed location on the x equals one face of the environment map (which in this example is at y=0.4 and z=−0.8). The values for the indexed location on the indexed face are then used in the conventional manner to retrieve the appropriate shading values from the indexed face of the map.

The indexed location on the selected 2-D map can then be supplied to conventional texture mapping algorithms or devices, which then determine the surface shading attributes for the pixel representing displayed point P on the display device. For example, the texture mapping device could determine the pixel shading attributes by averaging the intensity values within the indexed region of the indexed face of the 2-D map.

Cubic environment maps are not the only type of environment maps that can be used in the present invention. In fact, a three dimensional map consisting of any set of 2-D maps which cumulatively includes one and only one location for every possible direction from the center of the environment could be used in the present invention, because such a set of maps allows a unique location on it to be uniquely identified by a the direction of the reflection vector. For example, as further discussed below by reference to FIG. 8, octahedron environment maps can be utilized in the present invention. The use of 2-D maps is advantageous, because two-dimensional images require far less storage than three-dimensional volume tables.

Figure 7A:
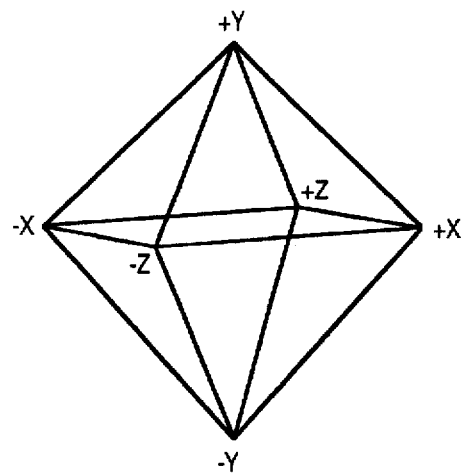
FIG. 7A presents one type of octahedron map whose surface coordinates are described by |X|+|Y|+|Z|=1.
Figure 7B:
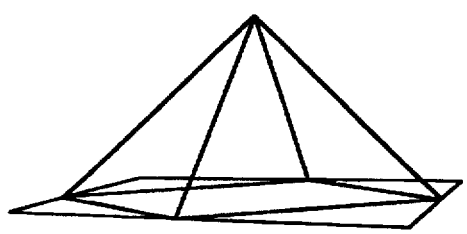
FIGS. 7B and 7C present the eight faces of the octahedron unfolded into a square to match conventional texture mapping hardware.
Figure 7C:
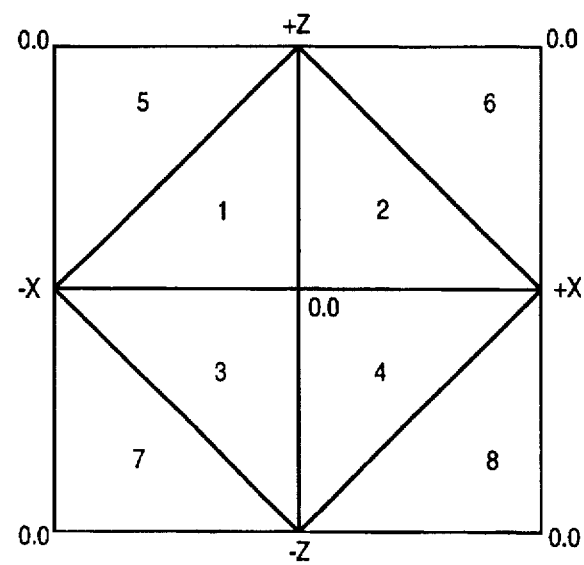

FIG. 7A sets forth one type of octahedron map. This octahedron map has vertices which lie on the Cartesian axes and has its surface coordinates described by |X|+|Y|+|Z|=1. This map further has eight faces which differ from each other in the signs of their x, y, and z coordinates. For example, all the points with positive x and negative y and z which solve the above equation form one face. So given the sign bits of the three components of the reflection vector $R_x$, $R_y$, and $R_z$, a particular face of the octahedron can be selected. Furthermore, if viewed orthographically along one of the coordinate axis, for example from +Y or from −Y, the four visible faces in each case look like 45-degree right triangles, which can be indexed by their surface X and Z positions alone. Moreover, as shown in FIGS. 7B and 7C, the eight faces of the octahedron can be unfolded into a square to match conventional texture mapping hardware, because these faces form 45-degree right triangles when they are viewed orthographically. Thus, as set forth below in Table 1, the eight faces of the octahedron map to triangles in a square environment texture map which has indexes s and t.

conventional two-dimensional mapping storage (as shown in FIGS. 7B and 7C), the location where the reflection vector indexes the referenced face of the map is deduced by dividing the $R_x$ and $R_z$ components of the reflection vector by the sum of the magnitudes of the reflection vector components ($|R_x|+|R_y|+|R_z|$).

TABLE 1

| Face | X-to-S mapping | C-to-T mapping | Z-to-T mapping | Z-to-S mapping |
|---|---|---|---|---|
| 1 -X,+Y,+Z | X = -1.0 ... 0.0 |  | Z = -0.0 ... 1.0 |  |
|  | S = 0.0 ... 0.5 |  | T = 0.5 ... 1.0 |  |
| 2 +X,+Y,+Z | X = 0.0 ... 1.0 |  | Z = 0.0 ... 1.0 |  |
|  | S = 0.5 ... 1.0 |  | T = 0.5 ... 1.0 |  |
| 3 -X,+Y,-Z | X = -1.0 ... 0.0 |  | Z = -1.0 ... 0.0 |  |
|  | S = 0.0 ... 0.5 |  | T = 0.0 ... 0.5 |  |
| 4 +X,+Y,-Z | X = 0.0 ... 1.0 |  | Z = -1.0 ... 0.0 |  |
|  | S = 0.5 ... 1.0 |  | T = 0.0 ... 0.5 |  |
| 5 -X,-Y,+Z |  | X = -1.0 ... 0.0 |  | Z = 0.0 ... 1.0 |
|  |  | T = 0.5 ... 1.0 |  | S = 0.0 ... 0.5 |
| 6 +X,-Y,+Z |  | X = -0.0 ... 1.0 |  | Z = 0.0 ... 1.0 |
|  |  | T = 1.0 ... 0.5 |  | S = 0.0 ... 0.5 |
| 7 -X,-Y,-Z |  | X = 1.0 ... 0.0 |  | Z = -1.0 ... 0.0 |
|  |  | T = 0.5 ... 0.0 |  | S = 0.5 ... 0.0 |
| 8 +X,-Y,-Z |  | X = 0.0 ... 1.0 |  | Z = -1.0 ... 0.0 |
|  |  | T = 0.0 ... 0.5 |  | S = 0.5 ... 1.0 |

Figure 8:
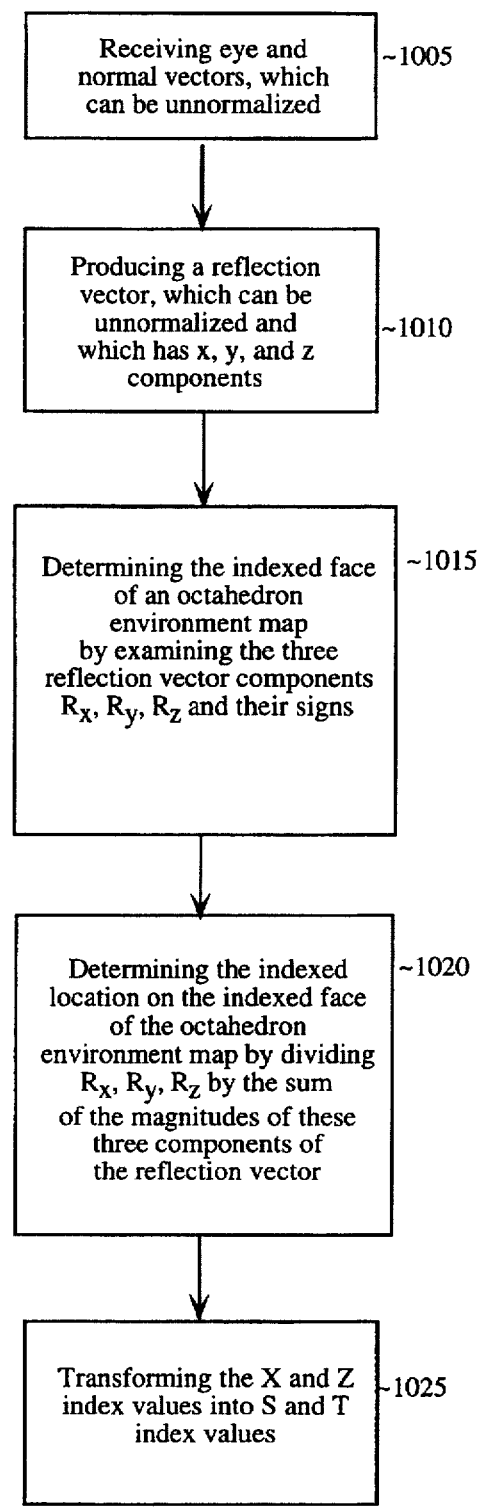
FIG. 8 presents still another embodiment of the reflection vector shading method of the present invention.

FIG. 8 sets forth another embodiment of the present invention's method for generating reflection vectors and for using these reflection vectors to index locations on an octahedron environment map which is aligned with the axes of the coordinate system which also determines the coordinate of the reflection vector. As shown in this figure, at step 1005, an eye vector E and a surface normal vector N, for a particular displayed point P of a graphical object (i.e., a point on the object that is represented by a pixel on the display device), are received. Both of these vectors can be unnormalized. At step 1010, a reflection vector is produced. This reflection vector is an unnormalized vector when either the normal vector or the eye vector is unnormalized. Moreover, this reflection vector is represented by three Cartesian coordinates $R_x$, $R_y$, and $R_z$. In one embodiment of the present invention, the reflection vector is produced by using the following equation:

$$R=2*N*(N \cdot E)-E*(N \cdot N),  \quad (iii)$$

which, as mentioned below, is derived from the prior art equation (ii).

As further shown in FIG. 8, at step 1015 and 1020, the location where this generated reflection vector indexes (i.e., where this reflection vector or its projection intersects) an octahedron environment map, which is aligned with the axes of the coordinate system, is determined. As mentioned before, the eight faces of an octahedron environment map differ from each other in the signs of their x, y, and z coordinates. Consequently, at step 1015, the face of the environment map that the reflection vector indexes is derived by examining the sign bits of the three components of the reflection vector $R_x$, $R_y$, and $R_z$.

Figure 9:
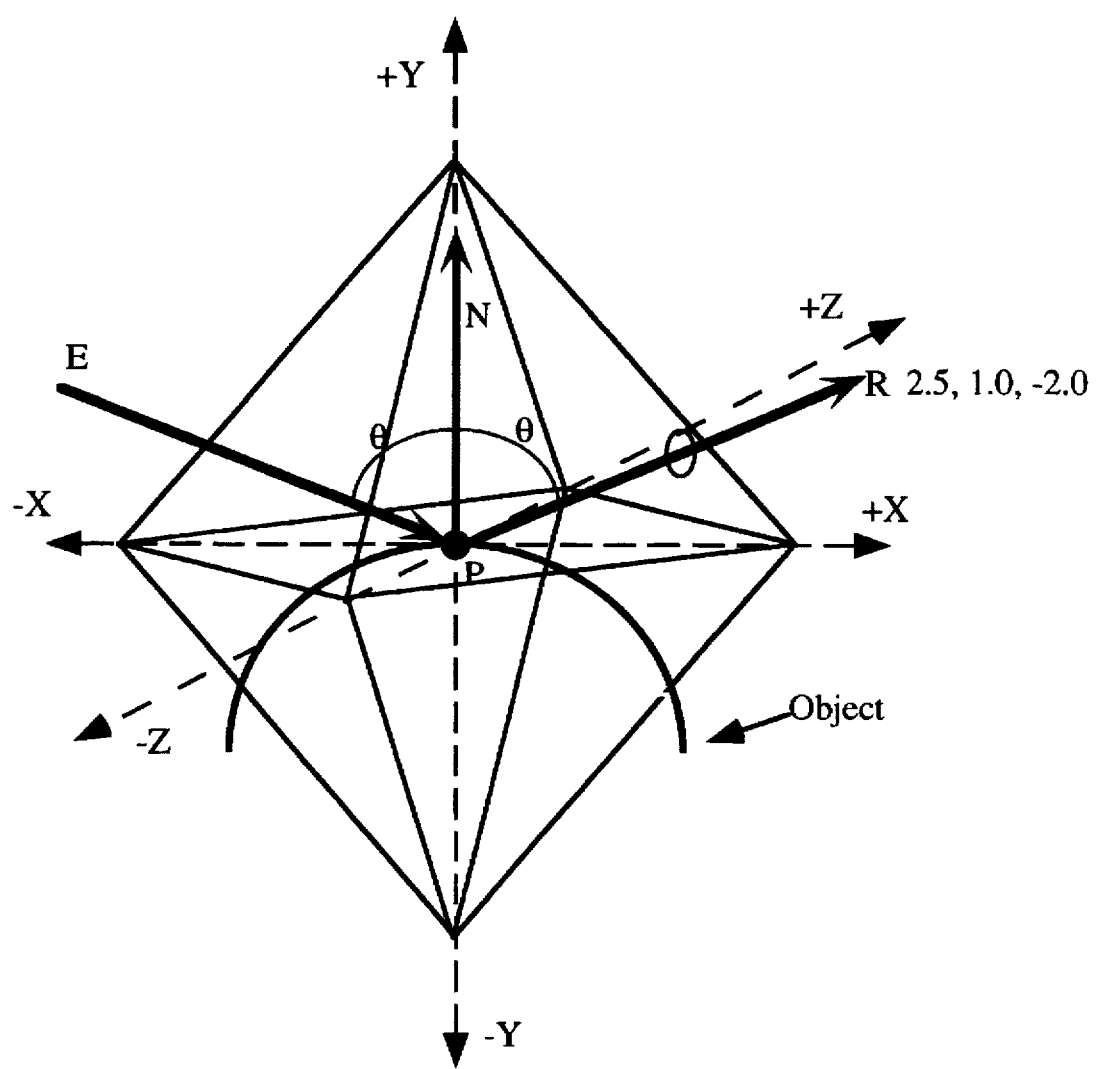
FIG. 9 presents a vector diagram of the generated reflection vector of the present invention indexing an octahedron environment map which is aligned with the axis of the coordinate system.

Furthermore, unlike cubic environment map projection which involves dividing the largest magnitude component into the other two, octahedron projection involves dividing the sum of the magnitudes of the components ($|R_x|+|R_y|+|R_z|$) into two of the components. Thus, for the embodiments of the present invention which index an octahedron environment map by using x and z coordinates to reference a An example of steps 1015 and 1020 is shown in FIG. 9 (which presents a vector diagram of a generated reflection vector of the present invention indexing an octahedron environment map which is aligned with the axis of the coordinate system). The reflection vector is represented by the coordinates 2.5, 1.0, -2.0. At step 1015 a determination is made that the reflection vector indexes face four of the octahedron environment map by examining the sign bits of the reflection vector components. At step 1020, the $R_x$ and $R_z$ components are divided by the magnitude of the sum of the reflection vector components (i.e., divided by 5.5) to determine the indexed location on face four of the environment map (which in this example is at x=0.455 and z=-0.364). Finally, at step 1025, the x and z coordinates are transformed into s and t coordinates to obtain the shading values for the referenced location of the octahedron environment map from the two-dimensional texture mapping storage.

Figure 10:
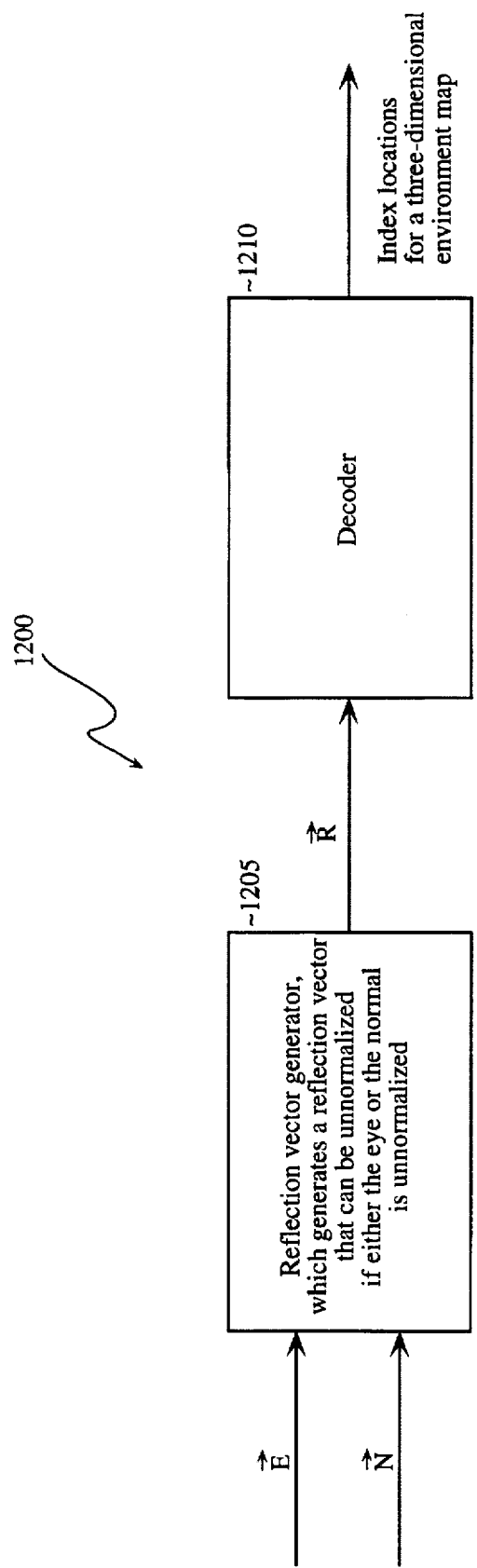
FIG. 10 presents a block diagram for one embodiment of a reflection vector generating apparatus of the present invention.

FIG. 10 sets forth one embodiment of the reflection vector shading hardware of the present invention. As shown in this figure, reflection vector shading hardware 1200 includes reflection vector generator 1205 and decoder 1210. In order to generate a reflection vector, reflection vector shading hardware 1200 receives an eye vector and a normal vector for an eye vector E and a surface normal vector N, for a particular displayed point P of a graphical object (i.e., a point on the object that is represented by a pixel on the display device). This reflection vector is unnormalized when either the eye vector or the normal vector is unnormalized. As mentioned before, if the normal and the eye vectors are normalized, the reflection vector is represented by the following prior art equation:

$$R_n=2*N_n*(N_n \cdot E_n)-E_n. \quad (ii)$$

Since a vector is normalized by dividing the vector by its length, this prior art equation (ii) can be replaced by the following equation:

$$Rn = 2* \frac{N}{|N|} * \frac{(N \cdot E)}{|N||E|} - \frac{E}{|E|}.$$

This transformation results in the multiplication of two |N|'s in the denominator, which equals (N·N). Substituting (N·N) for |N|*|N| yields:

$$Rn = 2* \frac{N*(N \cdot E)}{(N \cdot N)*|E|} - \frac{E}{|E|}.$$

But since the reflection vector R does not need to be normalized, both sides of the above equation can be multiplied by |E|*(N·N), which results in the following equation:

$$\begin{aligned} R &= R_n*(N \cdot N)*|E| \\ &= 2*N*(N \cdot E) - E*(N \cdot N). \end{aligned} \quad \text{(iii)}$$

Consequently, in one embodiment of the present invention, reflection vector generator 1205 uses the relationship set forth in equation (iii) to generate the reflection vector. By using equation (iii), reflection vector generator 1205 can generate an unnormalized reflection vector by only using two dot products, two vector scaling operations, and a vector subtraction.

Figure 11:
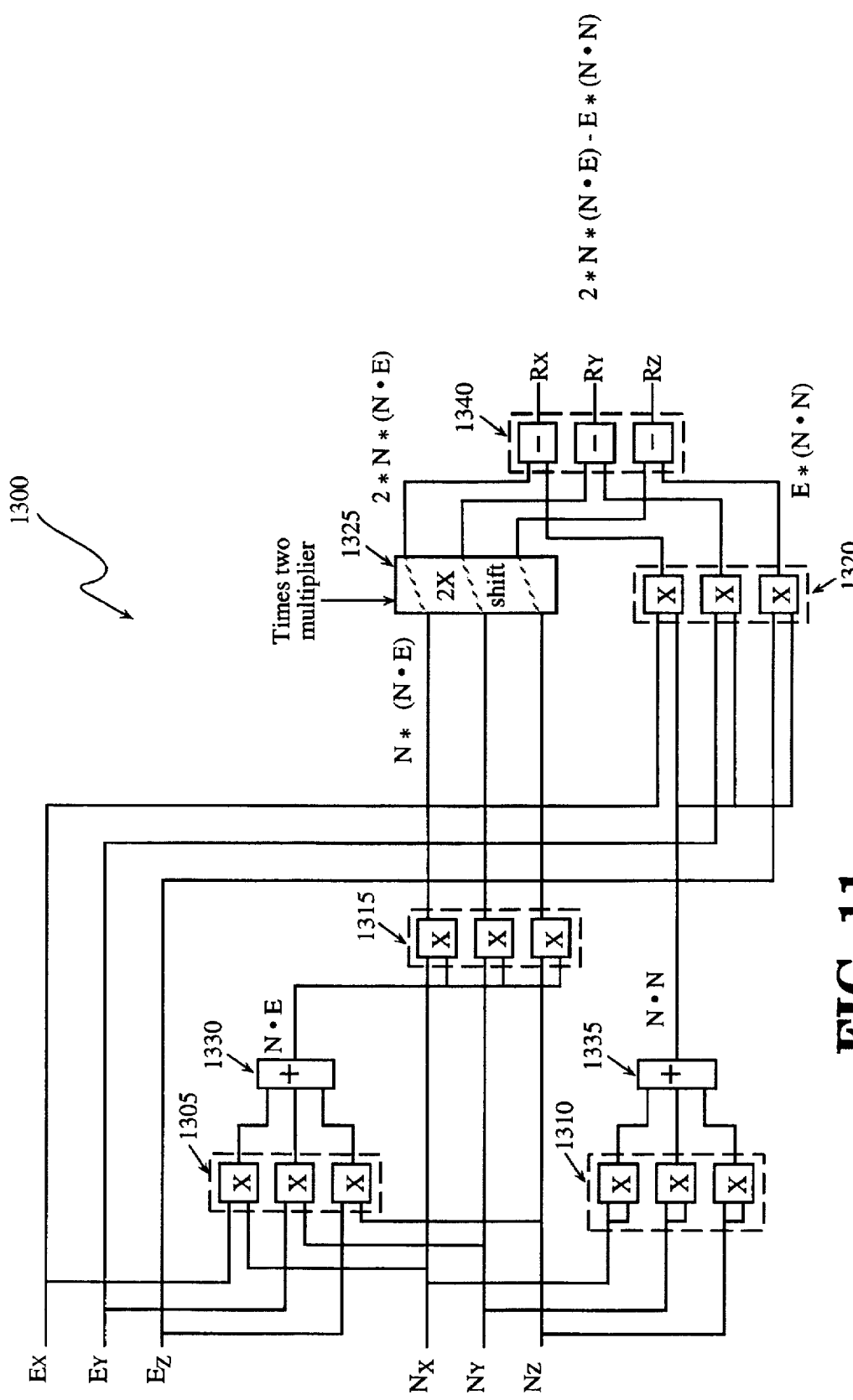
FIG. 11 presents one embodiment of a reflection vector generator used in the reflection vector generating apparatus of FIG. 10.

FIG. 11 sets forth one embodiment of reflection vector generator 1205 of FIG. 10. As shown in FIG. 11, reflection vector generator 1300 can be implemented with a number of multipliers 1305, 1310, 1315, 1320, and 1325, a number of adders 1330 and 1335, and a subtracter 1340. First set of multipliers 1305 and adder 1330 generate the (N·E) component of equation (iii), while second set of multipliers 1310 and adder 1335 generate the (N·N) component of equation (iii). Third set of multipliers 1315 and times two multiplier 1325 then generate the 2*N*(N·E) component of equation (iii), while the fourth set of multipliers 1320 generates the E*(N·N) component of equation (iii). Finally, subtracter 1340 subtracts the output of the fourth set of multiplier 1320 from the output of times two multiplier 1325 in order to produce the above-mentioned equation (iii).

Thus, in one embodiment of the present invention, reflection vector generator 1205 of FIG. 10 uses the above-mentioned equation (iii) to generate a reflection vector based on the normal and the eye vectors which need not be normalized. Reflection vector generator 1205 then supplies the generated reflection vector to decoder 1210. In turn, decoder 1210 determines the location where the reflection vector indexes a three-dimensional environment map in the manner described above (e.g. steps 615 and 620 of FIG. 5). Decoder 1210 of FIG. 10 then supplies this indexed location to a conventional texture mapping device, which in turn projects the two-dimensional image indexed on the environment map onto particular pixel P.

Figure 12:
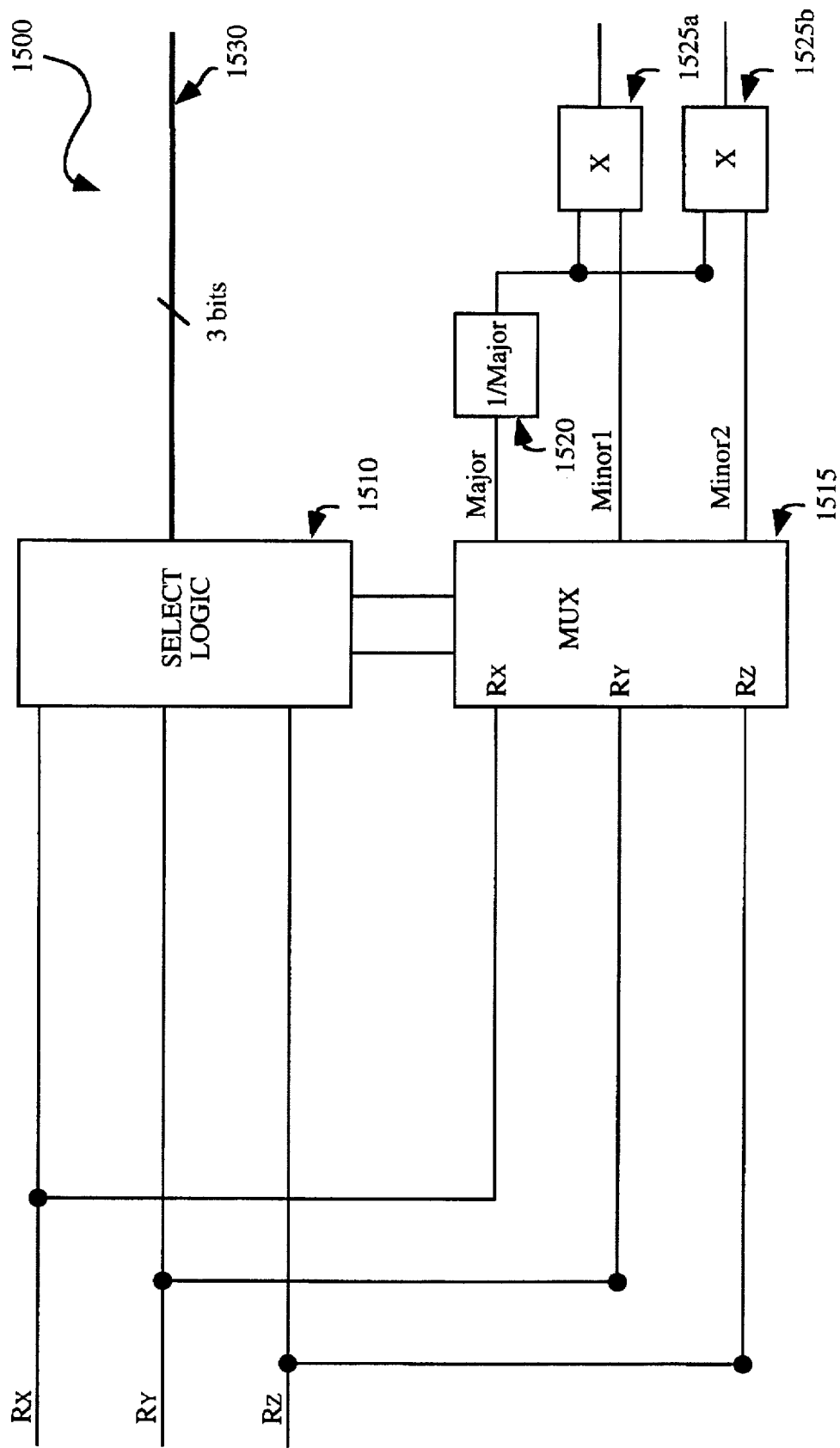
FIG. 12 presents an embodiment of the decoder used in the reflection vector generating apparatus of FIG. 10.

For the embodiments of reflection vector shading hardware 1200 that are designed to operate with a cubic environment map which is aligned with the axis of the coordinate system which specifies the reflection vector, FIG. 12 sets forth an embodiment of decoder 1210. As shown in this figure, decoder 1500 includes select logic 1510, multiplexor 1515, divider 1520, and two multipliers 1525. This decoder receives the x, y, and z components of the generated reflection vector from reflection vector generator 1205, in order (1) to determine the indexed face of a cubic environment map that the reflection vector selects/indexes, and (2) to determine the indexed location on this indexed face.

The select logic 1510 is coupled to receive the components Rx, Ry, Rz of the reflection vector and determines the component of the reflection vector that has the largest magnitude. The select logic unit 1510 also determines the sign of the reflection vector's component with the largest magnitude. Based on these determinations, select logic 1510 (1) supplies a two-bit signal to multiplexor 1515 in order to cause this multiplexor to identify the axis of this largest coordinate as the major axis, and (2) supplies a three-bit signal on line 1530, which identifies the indexed face of the cubic environment map, to conventional texture mapping hardware.

Multiplexor 1515 then supplies the major axis coordinate to divider 1520 which produces the reciprocal of the inputted major coordinate value. Based on a pre-determined relationship that is pre-programmed in the multiplexor, multiplexor 1515 then defines the axis of the two smaller coordinates as a first minor axis and a second minor axis. Multiplexor 1515 then supplies these minor axes' coordinates to multipliers 1525. These multipliers in turn generate the indexed location on the indexed face of the cubic environment map by multiplying the two minor coordinates by the output of divider 1520.

It will be appreciated that the apparatus of the invention may be a general purpose processor (e.g. a microprocessor or a microcontroller or an ASIC) which is controlled by software to generate the unnormalized reflection vector at a pixel location and then to decode this vector to produce a location indexed by this vector in a selected 2-dimensional map in the environment map. This embodiment may be implemented by having the software instruct the processor to compute the reflection vector in the manner described above (e.g. equation iii) and to decode the vector also in the manner described above.

As mentioned before, computer graphic systems have long sought to incorporate surface reflections in their computer graphic models, because surface reflections are useful for appraising the smoothness and the curvature of complex surfaces. By utilizing the above-described teachings of the present invention, computer graphic systems can now generate surface reflections at real time speeds allowing the user to interactively manipulate the computer images presented by such systems. More specifically, a computer graphic system can now allow its viewers to inspect the surface curvature and smoothness of its model (1) by generating reflection vectors, which can be unnormalized, for every displayed point of its model, and (2) by shading its model with the images that these reflection vectors index on an environment map.

Alternatively, if a computer generated object is relatively far from the viewer (i.e., if the eye vector changes relatively slowly across the surface of the computer generated object), a computer graphic system can render this object with rich surface reflections by (1) generating reflection vectors, that can be unnormalized, for the vertices of the polygons representing this object, (2) generating the remaining reflection vectors for this object through linear interpolation, and (3) shading this object with the images that these generated reflection vectors index on an environment map.

The present invention enables computer graphic systems to produce rich surface reflections at real time speeds (i.e., at speeds that allow the viewer to move interactively with respect to the computer generated object), because the present invention provides an environment mapping method which does not require the normalization of the reflection vectors. In fact, if computer graphic systems employ the embodiments of the present invention that utilize the above-mentioned equation (iii) to generate reflection vectors, these systems can render rich surface reflections at real time speeds by only computing two dot products, two vector scaling products, and a vector subtraction for each reflection vector.

The present invention is further advantageous because it provides a method and an apparatus for rendering high-quality specular highlights in real time and independent of the number of light sources. As mentioned above, because the present invention provides a shading method which does not require the normalization of the reflection vectors, the present invention enables computer graphic systems to produce rich surface reflections (such as specular highlights) at real time speeds allowing interactive use by a user of the computer system.

In addition, since environment maps are pre-computed and since these maps can contain any number of area light sources, the present invention does not suffer from any rendering-time penalty for rendering specular highlights when there is a high number of light sources. Thus, by incorporating an arbitrary number of light sources into an environment map that is indexed by reflection vectors that are generated at real time speeds, the present invention can render high quality specular highlights in real time and independent of the number of light sources. Specular spread functions can be incorporated into the environment map itself if they are based solely on relative reflection angle. Thus, a Phong highlight can be incorporated, allowing real-time interactive Phong shading.

Furthermore, the embodiments of the present invention that generate index values for a cubic environment map are also advantageous because these embodiments do not need to utilize perspective-correcting texture hardware. When a computer graphic system incorporates perspective viewing in its model the reflection direction has to be projected from screen space back to the world space of the environment map, in order to insure that the reflection vector correctly indexes the environment map. Perspective viewing is accomplished by using homogenous factor 1/w (where w is proportional to the distance between a viewer and a displayed point) to substitute N/w and E/w for the normal and the eye vectors iterated in screen space. These two substituted vectors are then used to calculate R/w.

Prior art environment mapping techniques then employ perspective-correct texture divider to divide the result of this calculation (i.e., R/w) by 1/w at each pixel in order to return the reflection vector to the world space coordinates direction. However, the embodiments of the present invention that generate index values obviate the need for this divider, because in these embodiments the w's in the denominators of each component of R/w cancel. These embodiments of the present invention then can use the prior art perspective-correct divider for index calculations.

One of ordinary skill in the art would recognize that the above-described invention may be embodied in other specific forms without departing from the spirit or the essential characteristics of the disclosure. For instance, in alternative embodiments of the present invention, other polygonal-faced surfaces, such as dodecahedron or isocahedron can be used as environment maps. Thus, while certain exemplary embodiments have been described and shown in the accompanying drawings, the invention is not to be limited by the foregoing illustrative details but rather is to be defined by the appended claims.

What is claimed is:

1. A method for generating a reflection vector, said method comprising the steps of:

a) receiving an eye vector (E) and a normal vector (N) at least one of which is not normalized; and b) producing a reflection vector (R) without vector normalization.

2. The method of claim 1 further comprising the step of determining the location where the reflection vector indexes an environment map.

3. The method of claim 2 wherein said method is used to render specular highlights.

4. The method of claim 1, wherein $R=2*N*(N \cdot E)-E*(N \cdot N)$.

5. A method for generating a reflection vector that indexes one of a plurality of faces of a cubic environment map stored in a memory, said method comprising the steps of:

receiving an eye vector (E) and a normal vector (N);

producing a reflection vector (R) represented by a first coordinate, a second coordinate, and a third coordinate, wherein the reflection vector is unnormalized when one of the normal vector and the eye vector is unnormalized;

determining a largest coordinate having the largest magnitude of said first, second, and third coordinates; and generating a fourth coordinate, and a fifth coordinate, by dividing two of said first, second, and third coordinates by said largest coordinate, wherein said fourth, and fifth coordinates define the location on the cubic environment map where said reflection vector indexes said cubic environment map in said memory.

6. The method for generating a reflection vector of claim 5, wherein $R=2*N*(N \cdot E)-E*(N \cdot N)$.

7. In a data processing system which renders images, a method of generating reflections off a rendered object by using an environment representation comprising a set of 2-dimensional maps which are independent of a viewer's position, said method comprising:

receiving an eye vector (E) and a normal vector (N), at least one of which is not normalized;

producing a reflection vector (R) without vector normalization;

selecting a selected 2-dimensional map which contains a location indexed by said reflection vector;

determining said location on said selected 2-dimensional map; and sampling a reflection shading value at said location in said selected 2-dimensional map.

8. The method of claim 7, wherein $R=2*N*(N \cdot E)-E*(N \cdot N)$.

9. A method as in claim 7 wherein said environment representation comprises six 2-dimensional maps arranged as the faces of a cube which is aligned to an axis of a coordinate system, and wherein said step of selecting comprises selecting the 2-dimensional map corresponding to the largest component of said reflection vector and wherein said step of determining comprises dividing the two smaller components of said reflection vector by said largest component.

10. A method as in claim 7 wherein said environment representation comprises eight 2-dimensional maps arranged as the triangular faces of an octahedron which is aligned to an axis of a coordinate system, and wherein said step of selecting comprises selecting the 2-dimensional map corresponding to the direction indicated by the signs of a plurality of components of said reflection vectors and wherein said step of determining comprises dividing a plurality of magnitudes of said plurality of components by a sum of the magnitudes of said plurality of components.

11. A reflection vector generating apparatus for generating a reflection vector indexing one of a plurality of faces of an environment map, said apparatus comprising:

a) a reflection vector generator which receives an eye vector and a normal vector at least one of which is not normalized, said reflection vector generator producing a reflection vector without vector normalization;

b) a decoder coupled to the reflection vector generator to receive the reflection vector, said decoder determining the face of said environment map that said reflection vector indexes.

12. An apparatus as in claim 11 wherein said reflection vector generator comprises a plurality of multipliers and a shifter.

13. An apparatus as in claim 11 wherein said decoder comprises a multiplexer and a divider.

14. An apparatus as in claim 11 wherein said reflection vector generator and said decoder comprise one of a microprocessor or a microcontroller which is controlled by software to generate said reflection vector and to determine the face of said environment map which said reflection vector indexes.

15. An apparatus as in claim 11 wherein said decoder further determines an indexed location on said face.

16. An apparatus as in claim 11 further comprising:

memory coupled to said decoder, said memory storing said environment map;

a display, said display displaying a rendered object having reflections which are produced by said reflection generator;

a processor coupled to said display, said processor calculating said eye vector and said normal vector and providing said eye and normal vectors to said reflection vector generator.

17. A method as in claim 7, wherein said rendered object includes a first pixel, and wherein said method further comprises calculating a pixel shading value for said first pixel using said reflection shading value and displaying on said display device said first pixel having said pixel shading value.

18. A method as in claim 7 wherein said method is used to render specular highlights.

19. A method as in claim 18 wherein said environment representation includes a representation of specular highlights.

* * * * *